United States Patent [19]

Takahashi et al.

[11] Patent Number: 4,709,319
[45] Date of Patent: Nov. 24, 1987

[54] POWER SUPPLY DEVICE

[75] Inventors: Kazuyoshi Takahashi, Kawasaki; Koji Suzuki; Joji Nagahira, both of Yokohama; Kunio Yoshihara, Tokyo; Toshiro Matsui, Kawasaki; Tadashi Ishikawa, Tokyo, all of Japan

[73] Assignee: Canon Kabushiki Kaisha, Tokyo, Japan

[21] Appl. No.: 907,153

[22] Filed: Sep. 15, 1986

Related U.S. Application Data

[63] Continuation of Ser. No. 602,931, Apr. 23, 1984, abandoned.

[30] Foreign Application Priority Data

Apr. 28, 1983 [JP] Japan ................. 58-73997

[51] Int. Cl.$^4$ .................. H02M 3/335; H03K 3/33
[52] U.S. Cl. ..................... 363/49; 363/20; 363/97; 323/289; 307/280
[58] Field of Search ............ 363/20, 21, 24, 25, 363/97; 307/270, 280, 300; 323/289

[56] References Cited

U.S. PATENT DOCUMENTS

| | | | |
|---|---|---|---|
| 3,742,330 | 6/1973 | Hodges et al. | 321/9 A |
| 4,079,295 | 3/1978 | den Hollander | 315/411 |
| 4,092,709 | 5/1978 | Voigt et al. | 363/18 |
| 4,133,025 | 1/1979 | Wurzburg | 363/41 |
| 4,208,705 | 6/1980 | Hosoya | 363/49 |
| 4,253,136 | 2/1981 | Nanko | 363/21 |
| 4,293,904 | 10/1981 | Brooks et al. | 363/86 |
| 4,302,803 | 11/1981 | Shelly | 363/20 |
| 4,312,029 | 1/1982 | Zellmer | 323/289 |
| 4,327,404 | 4/1982 | Horiguchi | 363/19 |
| 4,370,701 | 1/1983 | Western | 363/20 |
| 4,460,951 | 7/1984 | Fenter et al. | 363/21 |
| 4,491,744 | 1/1985 | Corey | 307/270 |
| 4,499,532 | 2/1985 | Hudson et al. | 363/21 |

FOREIGN PATENT DOCUMENTS

| | | | |
|---|---|---|---|
| 56-84388 | 12/1982 | Japan | 323/901 |
| 56196521 | 6/1983 | Japan | 363/19 |

Primary Examiner—Peter S. Wong
Assistant Examiner—Judson H. Jones
Attorney, Agent, or Firm—Fitzpatrick, Cella, Harper & Scinto

[57] ABSTRACT

There is disclosed a high-voltage power supply device capable of high precise control with a simplified circuitry and with a reduced energy loss in which a high-voltage transformer is controlled by switching means which is driven by a power source including a negative power supply and operated in response to pulse signals.

6 Claims, 6 Drawing Figures

F I G. I
PRIOR ART

POWER SUPPLY DEVICE

This application is a continuation of application Ser. No. 602,931, now abandoned, filed Apr. 23, 1984.

BACKGROUND OF THE INVENTION

1. Field of the Invention

The present invention relates to a power supply device for generating a high voltage, and more particularly to such a power supply device utilizing a flyback transformer.

2. Description of the Prior Art

There are already known power supply devices utilizing a flyback transformer. In such known power supply devices the flyback transformer is driven, as shown in FIG. 1, by a power transistor-driving transformer 2 connected with an oscillator 1 and a power transistor 3 for activating a flyback transformer 4 for supplying a high voltage to a high-voltage circuit 5. In this manner the prior art requires a separate transformer 2 for driving the power transistor 3.

For this reason such known devices have been associated with drawbacks of:
- a relatively high manufacturing cost due to the use of the transformer; and
- difficulty in realizing highly precise control due to the use of a transformer of a poor input-output linearity in comparison with that of the semiconductor element.

SUMMARY OF THE INVENTION

In consideration of the foregoing, an object of the present invention is to provide a power supply device of a simple structure.

Another object of the present invention is to provide a power supply device capable of realizing highly precise control.

Still another object of the present invention is to provide a power supply device with a reduced energy loss.

Still another object of the present invention is to provide a power supply device allowing highly dense assembly.

Still another object of the present invention is to provide a power supply device of a reduced manufacturing cost.

Still another object of the present invention is to provide a power supply device in which a flyback transformer is driven with a negative power source.

Still another object of the present invention is to provide a power supply device in which the power for driving a flyback transformer is obtained from the output side thereof.

The foregoing and still other objects of the present invention will become fully apparent from the following description.

DETAILED DESCRIPTION OF THE PREFERRED EMBODIMENTS

Now the present invention will be clarified in detail by an embodiment thereof shown in the attached drawings.

Figure 1:
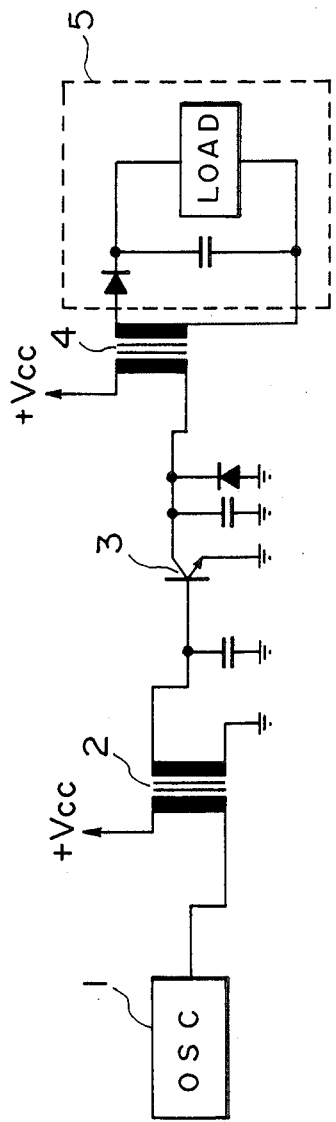
FIG. 1 is a circuit diagram showing a conventional power supply device.
Figure 2:
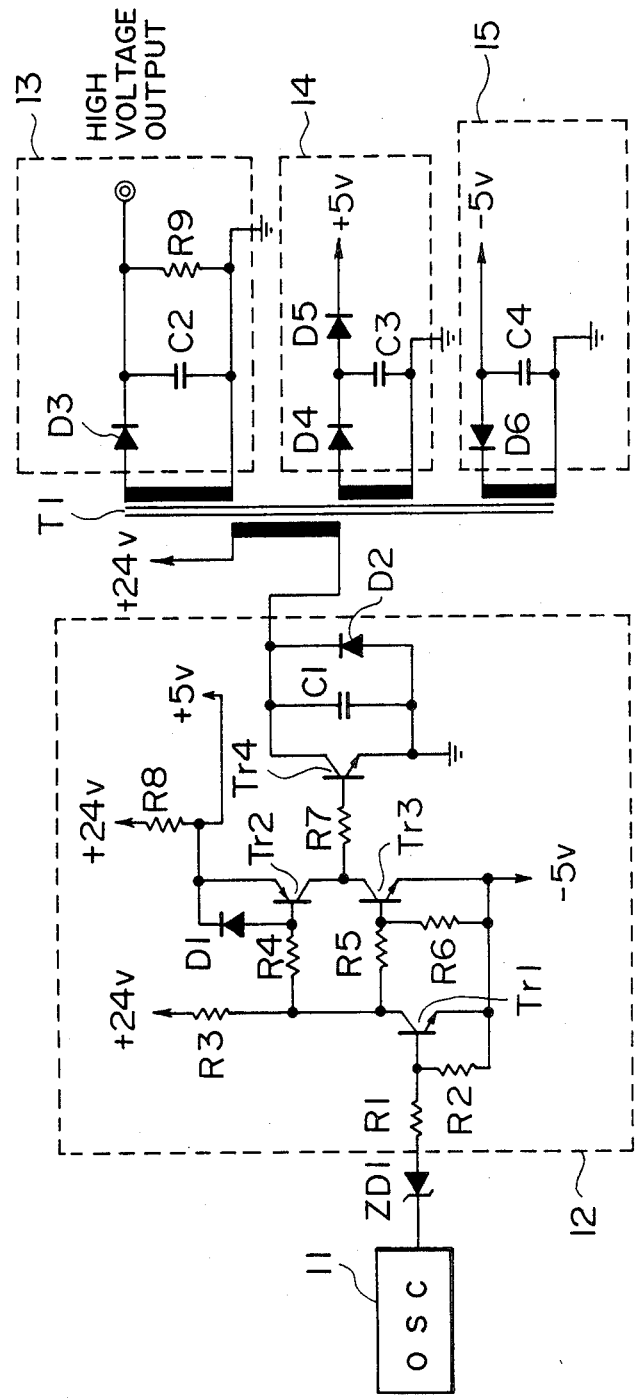
FIG. 2 is a circuit diagram showing a power supply device embodying the present invention.

FIG. 2 shows the circuit structure of an embodiment of the power supply device of the present invention, wherein shown are an oscillating circuit 11; a level-shifting Zener diode ZD1 connected with the output side of said oscillating circuit 11 for shifting the reference voltage from 0 V to −5 V; a driving circuit 12 connected with the anode of the Zener diode ZD1 and with the primary coil of a flyback transformer T1 for driving the same; a high-voltage output circuit 13 connected with a first secondary coil (hereinafter called the second coil) of said flyback transformer T1 for supplying an unrepresented load with an output high voltage; a positive voltage supply circuit 14 connected with a second secondary coil (hereinafter called third coil) of said flyback transformer T1 for generating a positive rectified voltage of +5 V for supply to said driving circuit 12; and a negative power source circuit 15 connected with a third secondary coil (hereinafter called fourth coil) of said flyback transformer T1 for generating a negative rectified voltage of −5 V for supply to said driving circuit 12.

The driving circuit 12 is provided with four transistors Tr1-Tr4, diode D1, D2, a condenser C1 and resistors R1-R8. An NPN transistor Tr1 is connected, at the base thereof, to the anode of the Zener diode ZD1 through the resistor R1, and receives the above-mentioned negative rectified voltage of −5 V at the emitter. The resistor R2 is connected between said base and emitter, and a power supply of +24 V to the primary coil of the flyback transformer T1 is supplied to the collector of said transistor through the resistor R3. A PNP transistor Tr2 is connected, at the base thereof and through the resistor R4, to the junction point between the collector of the transistor Tr1 and the resistor R3, and receives the above-mentioned positive rectified voltage of +5 V at the emitter. Between said base and emitter there is connected the diode D1. An NPN transistor Tr3 is connected, at the base thereof and through the resistor R5, to the junction point between the collector of the transistor Tr1 and the resistor R3, is connected further through the collector to the collector of the transistor Tr2, and receives the above-mentioned negative rectified voltage of −5 V at the emitter. Between said base and emitted there is connected the resistor R6.

An NPN transistor Tr4 for driving the flyback transformer, called the switching transistor, is connected, through the base thereof and the resistor R7, to the junction point between the collectors of the transistors Tr2, Tr4, is connected further at the collector to an end of the primary coil (hereinafter called first coil) of the flyback transformer T1, and is grounded at the emitter. The condenser C1 and the diode D2 are connected in parallel manner between said collector and emitter. The primary coil of the flyback transformer T1 receives, at the other end thereof, the primary power source voltage of +24 V.

In the high-voltage output circuit 13, a diode D3 is connected in a forward direction to an end of the high-voltage second coil of the flyback transformer T1, and a condenser C2 and a resistor R9 are connected in parallel manner between the cathode of said diode D3 and the other grounded end of said second coil to obtain an output high voltage from said cathode of the diode D3. In the positive power source circuit 14, diodes D4, D5 are serially connected in a forward direction to an end of the third coil of the flyback transformer Tr1, and a condenser C3 is connected between the junction point of said diodes D4, D5 and the other grounded end of said third coil to obtain the positive rectified voltage of +5 V from the cathode of said diode D5. In the negative power source circuit 15, a diode D6 is connected in an inverse direction to an end of the fourth coil of the flyback transformer T1 and a condenser C4 is connected between the anode of said diode D6 and the other grounded end of said fourth coil to obtain the negative rectified voltage of −5 V from the anode of said diode D6.

Figure 3:
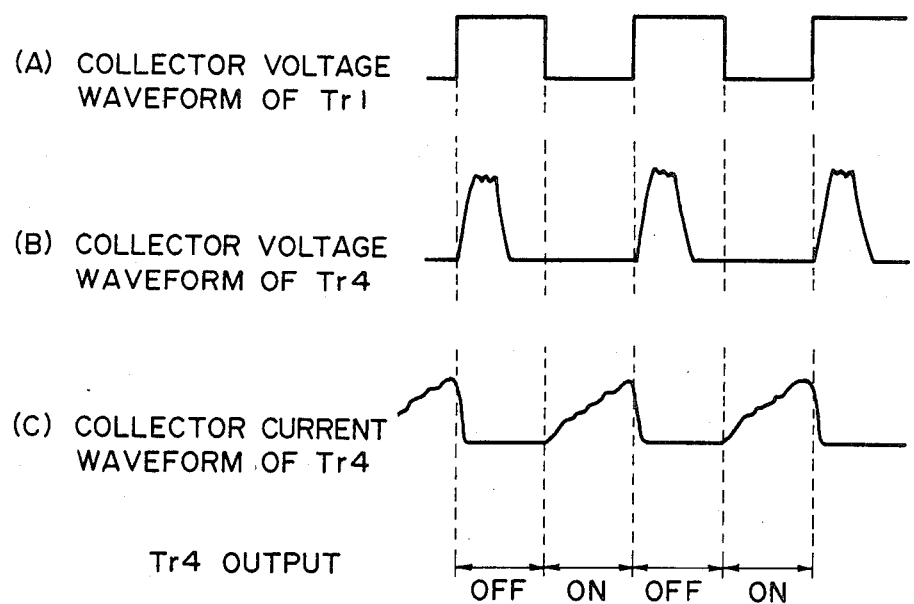
FIGS. 3A to 3C are wave form charts showing output signals from various parts of the circuit shown in FIG. 2.

In the above-described circuit structure, the transistor Tr1 of the driving circuit 12 is activated by the oscillating circuit 11 to repeat on-off switching operation (cf. FIG. 3A).

At the start of power supply, the voltages of +5 V and −5 V are not present since the third and fourth coils do not generate any voltages. Thus, upon entry of a pulse signal from the oscillating circuit 11 as shown in FIG. 3A, a current is supplied to the base of the transistor Tr4 from the power source of +24 V through the resistor R8, transistor Tr2 and resistor R7 to activate the transformer T1. Upon said activation the third and fourth coils respectively generate voltages of +5 V and −5 V, which thereafter principally govern the base drive of the transistor Tr4. More specifically the conductive state of the transistor Tr4 is attained by a current supply of +5 V to the base thereof through the transistor Tr2 and the resistor R7, and the nonconductive state of the transistor Tr4 is attained rapidly by inverse current supply to the base thereof through the transistor Tr3 and the resistor R7.

Thus, when the transistor Tr1 is turned on, the transistors Tr2 and Tr3 are respectively turned on and off to supply a current from the positive power source of +5 V through the transistor Tr2 and the resistor R7 to the base of the transistor Tr4, thus turning on the same (cf. FIG. 3B and 3C.). On the other hand, when the transistor Tr1 is turned off, the transistors Tr2 and Tr3 are respectively turned off and on to turn off the transistor Tr4 rapidly by the current supply from the negative power source of −5 V to the base of said transistor Tr4 (cf. FIGS. 3B and 3C).

Figure 4:
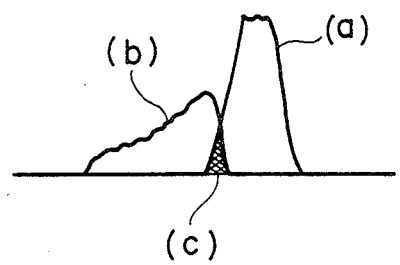
FIG. 4 is a wave form chart showing the function of the circuit shown in FIG. 2.

If an overlapping area (C), shown in FIG. 4, of the voltage wave form (A) and the current wave form (B) of the collector of the transistor Tr4 is large, there will be required a large heat radiator for the transistor Tr4 due to a large heat generation and a deteriorated energy efficiency of the transistor Tr4. However such wave form overlapping becomes a problem only immediately after the turning off of the transistor Tr4 and is not serious in the present embodiment since the turn-off characteristic of the transistor Tr4 is improved as shown in FIGS. 3B and 3C by the negative base potential of the transistor Tr4.

In the foregoing embodiment the power sources of +5 V and −5 V are generated at the second side of the flyback transformer, but there may naturally employed any other available voltage sources.

The power supply device described in the foregoing is particularly useful as a power supply for DC and AC chargers for use in an image forming apparatus such as a copier.

As explained in the foregoing, the switching transistor for driving the flyback transformer is driven by a negative voltage source to provide the advantages of:
improving the turn-off switching characteristic of said switching transistor, thus reducing the energy loss and preventing unnecessary heat generation; and
replacing a transformer for driving the switching transistor with a transistorized switching circuit, thereby enabling to reduce the manufacturing cost, to improve the precision of control and to achieve a high-density structure with a hybrid semiconductor structure.

What we claim is:

1. A power supply device comprising:
signal generating means for generating a reference signal;
switching means for performing a switching operation in response to the reference signal;
a transformer driven by said switching means, said transformer having a first secondary winding for producing a high voltage and a second secondary winding for producing a rectified negative voltage; and
first power source means including a first rectifying means for driving said switching means, said first rectifying means being connected to the second secondary winding of said transformer and supplying a rectified negative voltage to said switching means in order that said switching means can rapidly perform a switching operation thereof;
wherein said switching means comprises a switching transistor having a base driven (i) by a primary power supply to said transformer, and (ii) by the rectified negative voltage outputted from said first rectifying means.

2. A power supply device according to claim 1, wherein said transformer has a third secondary winding for producing a rectified positive voltage, and wherein said device further comprises a second power source means including a second rectifying means for driving said switching means for driving said switching means, said second rectifying means being connected to said third secondary winding of said transformer and supplying a rectified positive voltage to said switching means in order that said switching means can rapidly perform a switching operation thereof.

3. A power supply device according to claim 6, wherein said switching transistor also has the base driven by the rectified positive voltage outputted from said second rectifying means.

4. A power supply device according to claim 1, wherein said transformer is a flyback transformer.

5. A power supply device comprising:
signal generating means for generating a reference signal;
switching means for performing a switching operation in response to the reference signal;
a transformer driven by said switching means, said transformer having a first secondary winding for producing a high voltage and a second secondary winding for producing a negative voltage; and
power source means for driving said switching means, said first power source means being connected to the second secondary winding of said transformer and supplying the negative voltage to said switching means in order that said switching means can rapidly perform a switching operation thereof; and wherein said switching means comprises a switching transistor having a base driven (i) by a primary power supply to said transformer, (ii) by a positive rectified output of the secondary side of said transformer, and (iii) by a negative rectified output of the secondary side of said transformer.

6. A power supply device according to claim 5, wherein said transformer is a flyback transformer.

* * * * *

UNITED STATES PATENT AND TRADEMARK OFFICE
CERTIFICATE OF CORRECTION

PATENT NO. : 4,709,319

DATED : November 24, 1987

INVENTOR(S) : K. TAKAHASHI, ET AL.

It is certified that error appears in the above-identified patent and that said Letters Patent is hereby corrected as shown below:

COLUMN 2

Line 50, "emitted" should read --emitter--.

COLUMN 3

Line 63, "naturally" should read --naturally be--.

COLUMN 4

Lines 41-2, "for driving said switching means" (first occurrence) should be deleted.
    Line 48, "claim 6," should read --claim 2,--.

Signed and Sealed this

Seventeenth Day of May, 1988

Attest:

DONALD J. QUIGG

*Attesting Officer*       *Commissioner of Patents and Trademarks*